United States Patent
Haddad et al.

(10) Patent No.: US 12,014,363 B2
(45) Date of Patent: Jun. 18, 2024

(54) APPARATUS AND METHODS FOR NON-FUNGIBLE TOKENS AS UNIVERSAL DIGITAL IDENTIFICATION

(71) Applicant: Bank of America Corporation, Charlotte, NC (US)

(72) Inventors: Linda Haddad, Concord, CA (US); Lauren K. Alleman, Alameda, CA (US); Casey Andrew Augustine, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 316 days.

(21) Appl. No.: 17/550,208

(22) Filed: Dec. 14, 2021

(65) Prior Publication Data

US 2023/0186291 A1 Jun. 15, 2023

(51) Int. Cl.
*G06Q 20/38* (2012.01)
*G06Q 20/36* (2012.01)

(52) U.S. Cl.
CPC ....... *G06Q 20/3825* (2013.01); *G06Q 20/363* (2013.01); *G06Q 20/38215* (2013.01); *G06Q 20/3829* (2013.01); *G06Q 20/389* (2013.01)

(58) Field of Classification Search
CPC ............. G06Q 20/3825; G06Q 20/363; G06Q 20/38215; G06Q 20/3829; G06Q 20/389
See application file for complete search history.

(56) References Cited

U.S. PATENT DOCUMENTS

| | | | |
|---|---|---|---|
| 2020/0021446 A1* | 1/2020 | Roennow | H04L 9/0819 |
| 2020/0118131 A1* | 4/2020 | Diriye | H04L 9/3239 |
| 2020/0127851 A1* | 4/2020 | Finlow-Bates | H04L 63/0823 |
| 2022/0309491 A1* | 9/2022 | Shapiro | G06F 21/64 |
| 2023/0034169 A1* | 2/2023 | Ferenczi | H04L 63/0823 |

* cited by examiner

*Primary Examiner* — Jacob C. Coppola
*Assistant Examiner* — Scott Michael Diroma
(74) *Attorney, Agent, or Firm* — Weiss & Arons LLP

(57) ABSTRACT

Apparatus and methods for utilizing non-fungible tokens ("NFTs") as universal digital identification are provided. A user may be assigned an NFT on a distributed ledger attesting to the user's identity. The user may request to be authenticated. The user may be prompted to transfer the NFT to a smart contract on the distributed ledger. An authentication program may check the NFT and the NFT's history on the ledger to determine that the NFT belongs to the user. When the NFT belongs to the user, the authentication program may authenticate the user. The smart contract may transfer the NFT back to the user, so that the user may use the NFT again to be authenticated.

11 Claims, 7 Drawing Sheets

APPARATUS AND METHODS FOR NON-FUNGIBLE TOKENS AS UNIVERSAL DIGITAL IDENTIFICATION

FIELD OF TECHNOLOGY

Aspects of the disclosure relate to providing apparatus and methods for utilizing non-fungible tokens ("NFTs") as universal digital identification and authentication.

BACKGROUND OF THE DISCLOSURE

Existing authentication/identification systems rely on non-universal data to authenticate/identify a user. Each location or service (e.g., a building or a website) must gather authentication data by itself and create an authentication system to be used solely by that location or service. For example, a website may request a user create a username and password or send a one-time password ("OTP") for authentication, or the user may use a biometric sensor. Each location or service may gather that data and use it to authenticate the user.

However, for security purposes, users are often warned not to use the same authentication details in different places. Users are encouraged to create new and unique usernames and passwords for each separate location or service. In addition, users may be assigned authentication details by an employer, which may not be transferred to a new employer. As it may be difficult to remember multiple unique passwords and usernames, users may often reuse usernames and passwords, reducing security and increasing the risk of malicious activity.

Therefore, it would be desirable for apparatus and methods for universal digital authenticators that may be used across locations, services, and employers. NFTs may provide one tool for universal digital authenticators.

Multiple advantages over existing authentication methods and systems may be achieved through the use of NFTs to authenticate a user. First, the NFTs will be as secure as the blockchain/distributed ledger on which they are stored. Second, NFT authentication tokens may be portable between services, companies, websites etc. Third, the risk of malicious activity may be transferred from a service, company, website etc. to a user or the blockchain.

For example, through the present invention and disclosure, a service, company, website may no longer be required to store or take responsibility for authentication credentials, as the blockchain or distributed ledger will include the necessary authentication/identification information to authenticate a user. As long as the blockchain/ledger is secure, and as long as the user controls her private key, the NFT authentication token should be secure. And, even if neither of those two conditions are met, the risk (and responsibility) of malicious activity are transferred to the user and blockchain/ledger.

SUMMARY OF THE DISCLOSURE

It is an object of this disclosure to provide apparatus and methods for utilizing non-fungible tokens ("NFTs") as universal digital identification and authentication.

An authentication computer program product for authenticating universal digital identifications is provided. The computer program product may include executable instructions which may be executed by a processor (or processors) on a computer system. The program may receive, from a user, a request to authenticate the user. The program may prompt the user to transfer a non-fungible token ("NFT") from a distributed ledger wallet belonging to the user to a smart contract on the distributed ledger. The program may confirm receipt of the NFT at the smart contract, after the user transfers the NFT. The program may view the NFT at the smart contract. When the program determines that the NFT includes information that may be used to authenticate the user, it may authenticate the user and instruct the smart contract to release the NFT back to the user.

The NFT may be singular and only the user may have the ability to transfer the NFT to the smart contract. The user may transfer the NFT through the use of a private cryptographic key to the user's wallet or any other secure and appropriate method. The user may transfer the NFT to the smart contract via a (public) cryptographic key while keeping a private version of the cryptographic key hidden and available only to the user. In addition, when or if the user transfers the NFT to a second or subsequent user, the authentication computer program may refuse to authenticate the user because the NFT will no longer authenticate the user (although it may, in some circumstances, be able to authenticate the second user).

In an embodiment, the information within the NFT that the program may use to authenticate the user may include the user's name, a unique username, a unique alphanumeric identifier or ID code, or other information to connect the NFT with a particular user. The information may be included in metadata associated with the NFT, or within the NFT itself.

In an embodiment, the smart contract may be configured (i.e., programmed) to receive the NFT, hold the NFT for a pre-determined length of time after receipt, alert the authentication computer program that the NFT was received, record, on the distributed ledger, when the NFT is received, determine when the authentication computer program confirms receipt of the alert, and release the NFT back to the user. The NFT may be released at the earlier of an end of the pre-determined length of time or upon receipt of instructions from the authentication computer program to release the NFT back to the user.

In an embodiment, the pre-determined length of time may be five minutes, or any other suitable length of time. The time should be short enough so that the program may reasonably conclude that the user is attempting to login, and the attempt should not become stale.

In an embodiment, the NFT may be encrypted. In an embodiment, the program may include a key to decrypt the NFT.

In an embodiment, the distributed ledger may include a blockchain.

In an embodiment, the user may be assigned the NFT by an organization implementing an authentication standard. For example, there may be one governmental organization that provides an NFT to a user when presented with certain proof of identity, similar to receiving an identification card or passport. The organization may be public or private. The standard should be stringent enough to engender trust with users and entities so that the users and entities will trust a particular NFT belongs to a particular user and may be used for authentication purposes.

In an embodiment, information within the NFT or within the distributed ledger may include a record of where the NFT has been located on the distributed ledger (i.e., which smart contracts and which wallet(s)).

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
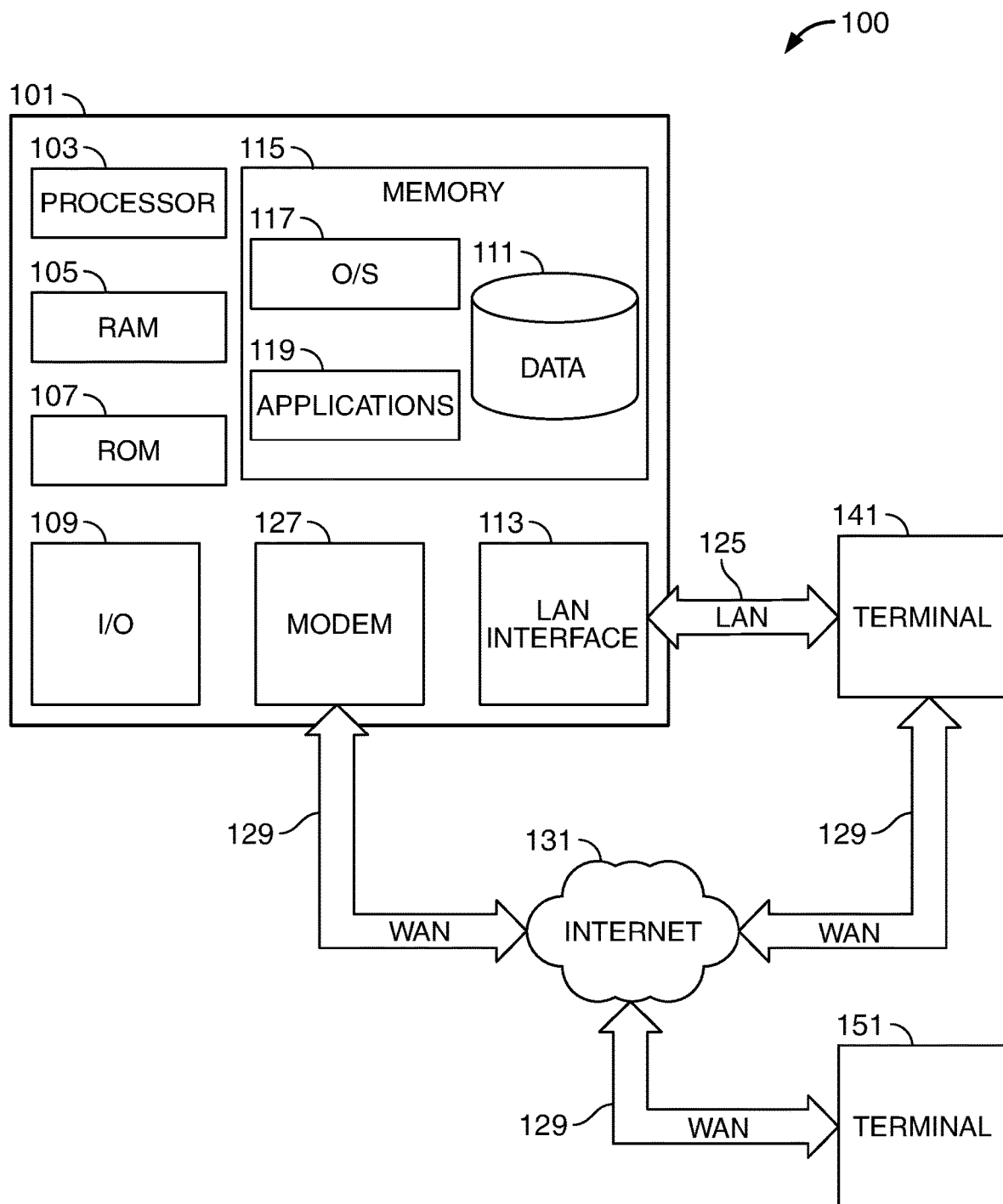
FIG. 1 shows an illustrative apparatus in accordance with principles of the disclosure.

It is an object of this disclosure to provide apparatus and methods for utilizing non-fungible tokens ("NFTs") as universal digital identification.

Distributed ledger technology may refer to a decentralized, tamperproof and transactional database. A distributed ledger provides a distributed, immutable, transparent, secure, and auditable ledger of transactions. The distributed ledger may provide a secure way to store and process transactions among trusted and untrusted nodes on a network. The distributed ledger may include a protocol that allows transactions to be verified by unreliable nodes. The distributed ledger can be consulted openly and fully, allowing access to all transactions that have occurred since the first transaction of the system, and can be verified and collated by any entity at any time. The distributed ledger also stores transactional information in a fashion that prevents alteration of the records stored in the distributed ledger. Therefore, if the ledger states that a particular token belongs to a particular wallet, and the movement of the token can be traced from the moment it first appeared in the ledger, that data may be trusted and may be used for various purposes.

The distributed ledger may store information in linked segments, or a chain of "blocks." The linked blocks may collectively form a "blockchain." Each block may store a set of transactions performed at a given time. Blocks are linked or chained to each other by a reference to the previous block. Each block in the distributed ledger is linked to the previously approved block using a cryptographic hash code of the previous block.

Distributed ledger security is accomplished by imposing strict rules and mutual agreement among nodes when attempting to add a new block of transactions to the distributed ledger. The strict rules and mutual agreement protocols may be referred to as a consensus mechanism. The consensus mechanism synchronizes the decentralized ledger across all nodes that write to the distributed ledger. The consensus mechanism ensures that all nodes agree on a single authoritative copy of the distributed ledger. Nodes that write to the distributed ledger network may be programmed to recognize the longest chain in a network of nodes as the authoritative source of information for the distributed ledger.

A key component of the consensus mechanism may be proof of work. In one embodiment of a distributed ledger, each node must successfully solve a computationally intensive task before adding a new block to the distributed ledger. The proof of work must be complex to solve and at the same time easily verifiable once completed. This dichotomy ensures that only one node is authorized to add a new block and that all other nodes can easily verify that the new block has been properly linked to a prior block. The computationally intensive nature of the block generation process provides tamperproof and auditable transactional database. Alternatively, a more recent paradigm is proof of stake in lieu of proof of work. Proof of stake may be less energy intensive and faster computationally. Other, known and unknown, methods of ensuring a distributed ledger's validity may be used as well as proof of work or proof of stake.

It is computationally expensive for a malicious attacker to modify a block and attempt to corrupt its contents. The rest of the trusted nodes on the network would continuously generate new blocks, outrunning the attacker in the block generation process. Therefore, a trusted branch of blocks will grow faster than any blocks that can be generated by the attacker. Nodes on a network are programmed to recognize the longest chain in the network as the authoritative source of information. The nodes on the network will therefore invalidate any shorter chains generated by the attacker.

In order for a manipulated block to be successfully added to the distributed ledger, it would be necessary for the malicious attacker to solve the proof of work faster than the rest of nodes on the network. This is structured to be computationally too expensive for the attacker. Accomplishing this feat requires having control of at least 51% of the computing resources in the network.

A transaction or block may be referred to as a token. A token may also be a representation of data included within a transaction or block. Generally, a token is a unit of data stored on distributed ledger. A token may also represent data or information outside of a transaction or block, as in, for example, cryptocurrencies such as Ethereum or Bitcoin. Tokens may be fungible. Tokens may be non-fungible. Fungible tokens, such as cryptocurrencies, are interchangeable. Non-fungible tokens may be unique (or in limited quantities) and are non-interchangeable. Distributed ledger technology may be used to provide and verify public proof of ownership of tokens. While all units (copies, or tokens) of a particular cryptocurrency may be mutually interchangeable (and thus fungible), non-fungible tokens are not mutually interchangeable. Currently, distributed ledgers may be used to verify ownership of tokens, but before the present invention, could not be used to verify the identity of the owner.

Distributed ledgers may use security methods such as public-key cryptography. A public key may be a long, random-looking string of numbers or other intensive data. The public key may function as a computerized address on the ledger, belonging to a particular user. The address may include a computerized wallet that may contain data or information belonging to the user, along with assets belonging to the user. Units of data, such as tokens, sent across the ledger may be recorded as belonging to that address. Along with the public key, a user may have a private key, which may be linked to the public key. A private key may function as a password that gives the user access to her address and wallet and allow the user to interact with the distributed ledger.

Distributed ledgers may be centralized or decentralized. In a centralized ledger, a server, or group of servers, may maintain the authoritative copy of the ledger, and any node interacting with the ledger (to view or update) may have to be approved by the server or servers. However, in in a decentralized system, every node may have a copy of the ledger and no centralized or official copy of the ledger may exist.

Distributed ledgers/blockchains may public or private (i.e., conclave or permissioned). Private ledgers may use an access control layer to determine who has access to the ledger to view or add to the ledger.

Distributed ledger smart contracts are code or programs on the ledger that may be partially or fully started, executed, or enforced without human interaction. As long as the parties to a smart contract understand what the smart contract will and will not do, actions taken by the smart contract may be binding on the parties.

An authentication computer program product for authenticating universal digital identification(s) is provided. The computer program may be run on an individual computer. The computer program may be run on a server. The computer program may be run on a smart mobile device. The computer program, or portions of the computer program may be linked to other computers or servers running the computer program. The computer program may be run on an authentication server or servers. The server or servers may be centralized or distributed.

The computer program product may include executable instructions which may be executed by a processor (or processors) on a computer system. Multiple processors may increase the speed of the computer program.

The program may receive, from a user, a request to authenticate the user. The user may submit the request through any appropriate computer method. The user may be requesting to be authenticated in order to log into a service, entity, application, website, etc. In an embodiment, the user may press a button (or the representation of a button) on a computer or mobile device screen. For example, if a user is attempting to log into a software application on her smartphone, the application may include a location for the user to enter a username and password, as well as an option to use a universal digital ID instead of a typical username or password. Alternatively, the only option may be to use a universal digital ID. By selecting the universal digital ID method, the user will send a request to the program to authenticate the user.

In order to authenticate the user, the program may prompt the user to transfer a non-fungible token ("NFT") from a distributed ledger wallet belonging to the user to a smart contract on the distributed ledger. The distributed ledger may include a blockchain. The distributed ledger may record transactions in a different method than a blockchain. A blockchain may be more secure.

This transfer may continue the authentication process. The NFT may be singular and only the user may have the ability to transfer the NFT to the smart contract. The NFT may contain data and metadata. The data and/or metadata may be information describing the user, such as the user's legal name, a unique identifier assigned to the user, or other information useful for identifying and authenticating the user.

The user may transfer the NFT to the smart contract through the use of a private cryptographic key to the user's wallet, or any other appropriate method. The user may transfer the NFT to the smart contract via a (public) cryptographic key while keeping a private version of the cryptographic key hidden and available only to the user. Transferring the NFT to the smart contract may be recorded on the ledger. If the ledger is a blockchain, the transfer may be data to form a new block on the blockchain. Only the user who has control of the wallet the NFT is in may transfer the NFT.

The user may access the wallet holding the NFT through a private key and a public key or other appropriate cryptographic method. The private key/public key paradigm may be referred to as a digital signature. A private key/public key paradigm may consist of three or more algorithms: 1) a key generation algorithm that creates or selects a private key and a corresponding public key; 2) a signing algorithm that produces a 'signature' when provided a message and a private key; and 3) a signature verifying algorithm can verify a signature's authenticity when given the message, the public key and signature. The keys generated are not generally reproducible (or guessed) by non-computers and may be stored in various file formats on a computer. The keys may be more secure than standard passwords. The keys may be secured or encrypted with any appropriate encryption algorithm.

In general, the authenticity of a signature generated from a message and private key can be verified by using the corresponding public key. In addition, in order for a private key to be secure, it should be computationally infeasible to generate a valid signature for a party without knowing that party's private key. A password as a private key may be less secure when compared to an extensive code (i.e., a key) that may be located on a file on a computer or storage device.

The smart contract may be a program/data located at a second user's wallet. The second user may be the entity or service the user is attempting to log into. The second user may be a third-party authentication service that the entity or service utilizes to authenticate visitors to the entity or service. The smart contract may simply be a location on the ledger or blockchain configured to automatically return the NFT at a particular time or times, or in other words, configured to hold the NFT for a particular length of time and then return the NFT to the user. The smart contract may include further functions, such as recording on the ledger when the NFT was transferred (both to the smart contract and back to the user's wallet). In an embodiment, the smart contract may encrypt the data and metadata in the NFT so that it may be only be viewed by a program or user that has a decryption key. In an embodiment, this may be a paid service.

Once the user has transferred the NFT to the smart contract, the program may confirm receipt of the NFT at the smart contract. As the transfer of the NFT to the smart contract is recorded on the ledger, and in general, the location of the NFT is visible to any program or user that can view the ledger. The program may view the NFT at the smart contract. That is, the program may view the data and metadata included with the NFT, including authenticating details of the user. When the program determines that the NFT includes information that may be used to authenticate the user, it may authenticate the user and instruct the smart contract to release the NFT back to the user. In an embodiment, the information within the NFT that the program may use to authenticate the user may include the user's name, a unique username, a unique alphanumeric identifier or ID code, or other information to connect the NFT with a particular user. The information may be included in metadata associated with the NFT, or within the NFT itself.

For example, if the NFT's data or metadata states, "This NFT belongs to Jane Doe, ID # 1AC345K92LG582," and the user requesting authentication is Jane Doe, the program may authenticate the user. Conversely, if the user attempting to authenticate is not Jane Doe, but John Doe, the program may deny authentication. Once the program has authenticated the user, it may instruct the smart contract to return the NFT to the user. In this embodiment, the NFT is never under the control of any user or entity other than the user and the smart contract.

In an embodiment, if the program denies authentication to the user, it may instruct the smart contract to not return the NFT, as malicious activity may have been detected and the NFT may have been compromised. Alternatively, the program may instruct the smart contract to return the NFT whether it authenticates the user or not.

In addition, when or if the user transfers the NFT to a second or subsequent user, the authentication computer program may refuse to authenticate the user because the NFT will no longer authenticate the user (although it may, in some circumstances, be able to authenticate the second user). The program may determine the user transferred the NFT to a different user by tracing the NFT's history on the ledger. In an embodiment, information within the NFT (data or metadata) or within the distributed ledger may include a record of where the NFT has been located on the distributed ledger (i.e., which smart contracts and which wallet(s)).

As the ledger is secure and history cannot be altered, a transfer of the NFT to a different user will be apparent in the ledger. For example, an NFT may be assigned to a user and appear in a user's wallet. As the NFT is non-fungible, no other copy of the NFT will have appeared on the ledger before assignment to the user, and any copy after assignment may be immediately visible on the ledger. The NFT's location, i.e., in the user's wallet, is known and appears on the ledger. Any transfer to a different user's wallet will appear on the ledger, otherwise the transfer will have been ineffective. In addition, any licit or illicit copies of the NFT will be readily ascertainable by view of the ledger and tracing the NFT back to its original wallet.

In an embodiment, the smart contract may be configured (i.e., programmed) to receive the NFT, hold the NFT for a pre-determined length of time after receipt, alert the authentication computer program that the NFT was received, record, on the distributed ledger, when the NFT is received, determine when the authentication computer program confirms receipt of the alert, and release the NFT back to the user. The smart contract may be configured to perform other functions as well, such as encrypting the data and metadata, transmitting the data and metadata to a server or the program, or other destination, upon request or on its own. The NFT may be released at the earlier of an end of the pre-determined length of time or upon receipt of instructions from the authentication computer program to release the NFT back to the user.

In an embodiment, the smart contract may be configured to retain the NFT, if the program or smart contract determines that the NFT was transferred by a user other than the true owner of the NFT. For example, if user A transfers an NFT that identifies user B in its data or metadata, the smart contract may be configured to retain the NFT. Retaining the NFT may prevent incorrect NFTs from clogging the ledger. This capability may increase the overall effectiveness of using NFTs as universal digital identification.

In an embodiment, the pre-determined length of time may be one minute, two minutes, five minutes, or any other suitable length of time. The time should be short enough so that the program may reasonably conclude that the user is attempting to login, and the attempt should not become stale. Increasing the length of time may leave the user open to being impersonated by a malicious actor or actors.

In an embodiment, the NFT may be encrypted. The NFT may be encrypted while in the user's wallet. The NFT may be encrypted before assignment to the user. However, encrypting the NFT before assignment to the user may run the risk of the encryption being unable to be updated in the future, as the data and metadata in the NFT may not be able to be changed. The NFT may be encrypted by the smart contract. Encrypting the data or the metadata may increase the security of the user. In an embodiment, the program may include a key to decrypt the NFT. For example, if the NFT includes identifying information of the user, that data may be encrypted so it is not visible to anyone but the program. The more robust the encryption the more likely a malicious actor will be unable to crack the encryption, increasing the security of the data.

In an embodiment, the user may be assigned the NFT by an organization implementing an authentication standard. Rather than every entity, application, website, etc. issuing a separate NFT each, a standard NFT issued by an agreeable organization or entity may allow for the NFT to be truly universal. For example, there may be one governmental organization that provides an NFT to a user when presented with certain proof of identity, similar to receiving an identification card or passport. The organization may be public or private. The standard should be stringent enough to engender trust with users and entities so that the users and entities will trust a particular NFT belongs to a particular user and may be used for authentication purposes. Having an outside, third-party organization issue and assign NFTs to individuals may make each NFT more universal, as long as that outside organization is trustworthy and trusted. The more entities, applications, websites, etc. that agree to accept NFTs issued by a particular outside organization, the more universal the NFT as identification will be.

A method for utilizing a non-fungible token ("NFT") as a universal digital identification is provided. The method may include the steps of assigning a singular NFT to a user on a distributed ledger. In an embodiment, the distributed ledger may include a blockchain.

The NFT may be singular, as in there are no official copies of the data or metadata included with the NFT. The NFT may include data and/or metadata useful for identifying the user, such as the user's legal name and a unique alphanumeric identifier code.

The method may include storing the NFT in a distributed ledger wallet belonging to the user, securing the wallet with a public cryptographic key and a private cryptographic key, receiving, at an authentication server remote from the user, a request by the user to authenticate the user, prompting, by the authentication server, the user to transfer the NFT to a smart contract located on the distributed ledger, and receiving the NFT at the smart contract. The wallet may be secured through any other appropriate cryptographic method.

The method may also include the steps of confirming, by the authentication server, receipt of the NFT at the smart contract, determining, by the authentication server, that the NFT is assigned to the user, authenticating, by the authentication server, the user, instructing, by the authentication server, the smart contract to release the NFT back to the user's wallet, and releasing, by the smart contract, the NFT back to the user's wallet. In an embodiment, the private cryptographic key is only accessibly by the user.

The server may determine that the NFT is assigned to the user by reviewing the data and/or metadata included with the NFT. The server (or an authentication program or engine on the server) may review the data and/or metadata for identifying information on the owner of the NFT. If that identifying information (name, ID number, etc.) matches the user attempting to authenticate, the server may authenticate the user.

In an embodiment, the method may include releasing the NFT back to the user's wallet at the end of a pre-determined length of time when the authentication server fails to instruct the smart contract to release the NFT back to the user's wallet. For example, the authentication server may time out, or fail to authenticate the user, or the instructions may be lost in transit.

In an embodiment, the pre-determined length of time is five minutes after receipt of the NFT at the smart contract or any other suitable length of time. The time should be short enough so that the program may reasonably conclude that the user is attempting to login, and the attempt should not become stale. An extended length of time may allow for a malicious actor to hijack the authentication attempt and impersonate the user.

In an embodiment, the pre-determined length of time may be adjusted by the smart contract, the user, the distributed ledger, or the server via a machine-learning algorithm. For example, the time may be increased or decreased via analysis of malicious attacks, user habits, the average amount of time it takes to authenticate, or other factors.

In an embodiment, the method may include recording, on the distributed ledger, the receipt of the NFT by the smart contract and the release of the NFT back to the user's wallet.

An apparatus for a universal digital identification utilizing distributed ledger technology is provided. The apparatus may include one or more computers running a distributed ledger and an authentication server or servers. The server(s) may be centralized or decentralized.

A user may be assigned a non-fungible token ("NFT") recorded on the distributed ledger. The NFT may function as a universal digital ID for the user, as it may be used, in various embodiments, in lieu of a username and password on various applications, websites, for services, by entities, etc.

The authentication server may receive a request to authenticate the user at a particular time. For example, in an embodiment, the user may desire to log into a banking (or other) application at 7:55 p.m. The user may open the application and press the login button. Instead of entering a username or password, the user may select the 'NFT' option. Selecting this option may send a request to authenticate the user to the server. In an embodiment, pressing the NFT button (or icon) may also generate a signed message on a distributed ledger (or blockchain) which may include the time the message was signed. In an embodiment, pressing the NFT button (or icon) may prompt the user to sign a message on the distributed ledger (or blockchain).

The authentication server may search the ledger/blockchain for a signed message. The server may authenticate a message recorded, by the user, on the distributed ledger. The user may sign the message using the user's keys as proof the message was signed by the user, and the public key (linked with the private key) will be visible as part of the signature on the message. The authentication server may determine when the message has been validly signed, and when the message has been signed within a predetermined amount of time of the particular time the user attempted to authenticate, the authentication server may determine that the user controlled the NFT at the particular time the server received the request to authenticate the user and authenticate the user based on the NFT and message.

In various embodiments, the message may be signed and recorded on the ledger before or after the authentication request. When the message has been signed within a predetermined time before or after (each length of time may be different) the authentication request, the server may authenticate the user. A longer length of time may enable malicious actors to impersonate the user.

In an embodiment, the NFT may include the user's name, a unique username, a unique alphanumeric identifier or ID code, or other information to connect the NFT with a particular user. The information may be included in metadata associated with the NFT, or within the NFT itself. Other appropriate information may be included.

In an embodiment, the NFT may be encrypted. In an embodiment, the server may include a key to decrypt the NFT.

In an embodiment, the predetermined amount of time may be between one minute before the particular time through five minutes after the particular time, or any other suitable time period. For example, the user may sign a message on the ledger shortly before or shortly after attempting to login to a website, service, entity, etc. If the message was signed within an amount of time where the server can reasonably conclude that the user attempting to login is the same user who signed the message, the server may authenticate the user.

In an embodiment, the pre-determined length of time may be adjusted through a machine learning algorithm. The algorithm may weigh various factors, such as average time to authenticate, the habits of a particular user or users, malicious activity, and learn which amounts of time are more secure and adjust the pre-determined length of time. For example, more secure or sensitive websites may require a shorter amount of time between the login attempt and signing the message. Or, a user's habits may be studied and taken into account by the server. For example, if a user continuously signs a message 90 seconds before attempting to login, the server may learn, through a machine learning algorithm, to not authenticate the user if the message was signed after the attempted login, or 120 seconds before.

In an embodiment, the user may be assigned the NFT by an organization implementing an authentication standard. For example, there may be one governmental organization that provides an NFT to a user when presented with certain proof of identity, similar to receiving an identification card or passport. The organization may be public or private. The standard should be stringent enough to engender trust with users and entities so that the users and entities will trust a particular NFT belongs to a particular user and may be used for authentication purposes. There may be one or more organizations, each implementing the same or a different standard. The more uniformity between standards and organizations, the more universal the NFT as a digital identification may be.

In an embodiment, the organization implementing the authentication standard does not control the authentication server. That is, the organization may be different than the website, service, entity, etc. the user is attempting to log into. An independent organization may increase the security and viability of the NFT as a universal digital identifier, as the NFT may not be tied to a particular company or website.

In an embodiment, the message may include a statement indicating that the user sent the authentication request, a statement indicating that the user controls the NFT, and a signature proving that the NFT is within a wallet belonging to the user. Other statements (such as: "I, the user, am attempting to login into www.website.com at this date and time . . . ") may be included as necessary.

In an embodiment, the NFT as a universal digital ID may be implemented within an existing software application. The application may be on a mobile computing device or a personal computing device. In another embodiment, the NFT as a universal digital ID may be implemented within a stand-alone software application on a mobile computing device or a personal computing device. For example, a self-contained application or program wherein a user opens the application, inputs a website or other app/program the user desires to access or log into, the stand-alone application may then send that authentication request along with signing a message on a distributed ledger or transferring an NFT belonging to the user to a smart contract on a distributed ledger. The website or application may then authenticate the user by checking the distributed ledger for the signed message or smart contract, and when the user has been authenticated, the application may open the website or other application with the user being authenticated.

In an embodiment, the executable instructions may include firmware embedded in hardware, as opposed to software.

The term "non-transitory memory," as used in this disclosure, is a limitation of the medium itself, i.e., it is a tangible medium and not a signal, as opposed to a limitation on data storage types (e.g., RAM vs. ROM). "Non-transitory memory" may include both RAM and ROM, as well as other types of memory.

A processor(s) may control the operation of the apparatus and its components, which may include RAM, ROM, an input/output module, and other memory. The microprocessor may also execute all software running on the apparatus. Other components commonly used for computers, such as EEPROM or Flash memory or any other suitable components, may also be part of the apparatus.

A communication link may enable communication with any computing device where the user may attempt to authenticate from as well as any server or servers. The communication link may include any necessary hardware (e.g., antennae) and software to control the link. Any appropriate communication link may be used. In an embodiment, the network used may be the Internet. In another embodiment, the network may be an internal intranet.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes a computer 101. Computer 101 may alternatively be referred to herein as a "computing device." Elements of apparatus 100, including computer 101, may be used to implement various aspects of the apparatus and methods disclosed herein. A "user" of apparatus 100 or computer 101 may include other computer systems or servers or a human.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101—e.g., the operating system 117 and applications 119 such as a distributed ledger, user wallet, NFT authentication program, and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as a distributed ledger, user wallet, NFT authentication program) along with any other data 111 (NFT data, ledger data) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology e.g., a hard drive or other non-transitory memory. The memory may store software including an operating system and any application(s) (such as a distributed ledger, user wallet, NFT authentication program) along with any data needed for the operation of the apparatus and to allow authentication of a user. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, or servers that include many or all of the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, Computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for distributed ledgers and NFT authentication program(s). In an embodiment, the authentication engine or computer may use AI/ML algorithm(s). The various tasks may be related to using a distributed ledger and an NFT to authenticate a user.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or authentication servers. The terminals 151 and/or 141 may be computers where the user is interacting with an application that requires authentication of the user.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other Computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
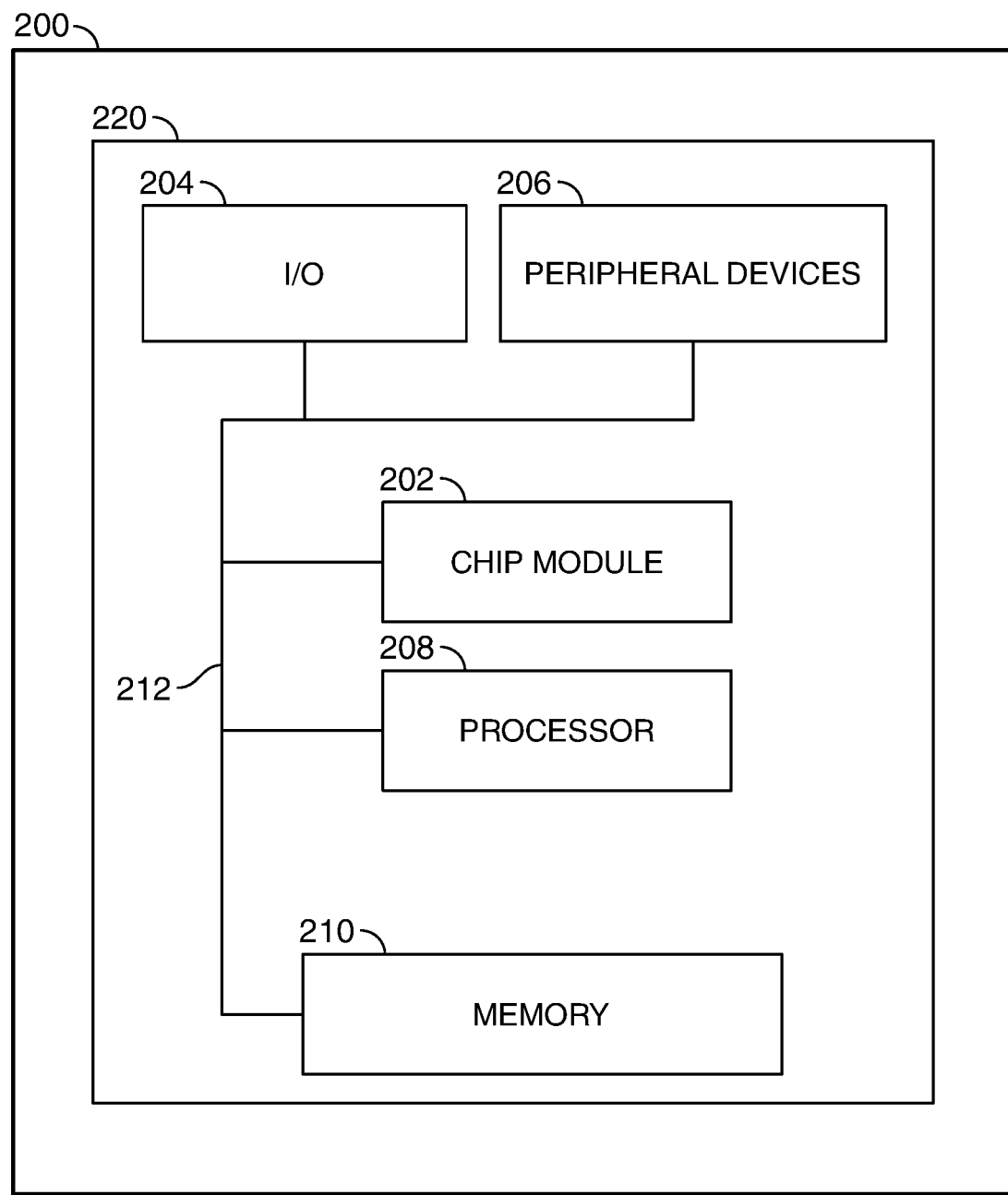
FIG. 2 shows an illustrative apparatus in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1, 3, and 6. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an display (LCD, LED, OLED, etc.), a touchscreen or any other suitable media or devices; peripheral devices 206, which may include other computers; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220.

In some embodiments, the components may be integrated into a single chip. The chip may be silicon-based.

Figure 3:
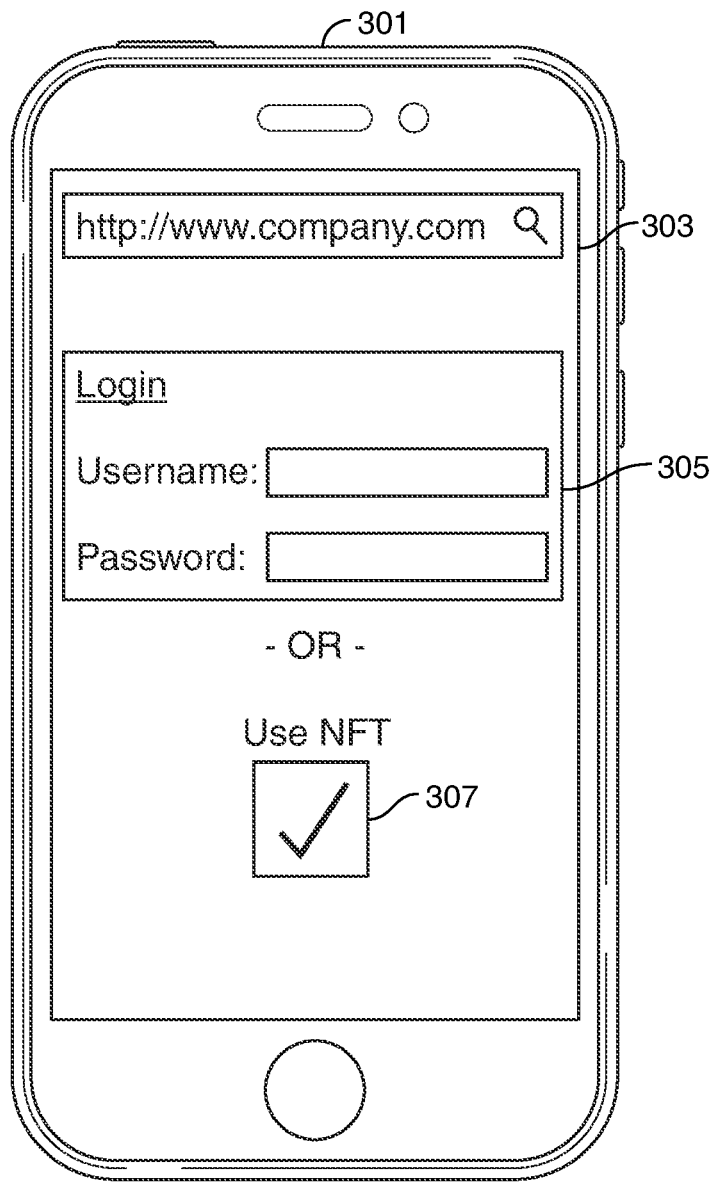
FIG. 3 shows an illustrative apparatus in accordance with principles of the disclosure.

FIG. 3 shows an illustrative apparatus in accordance with principles of the disclosure. A smartphone 301 may include a screen 303. The screen may be touch-sensitive. A user (not shown) may attempt to log into a company's website on the smartphone 301. The user may be presented the option of using a username and password 305 or using an NFT by selecting icon 307. Icon 307 may be placed at a different location on the screen 303. Placing icon 307 above login area 305 may incentivize a user to use an NFT authentication method instead of a standard username and password.

Selecting icon 307 may implement one or more of the methods described herein for using an NFT as a universal digital identification.

Figure 4:
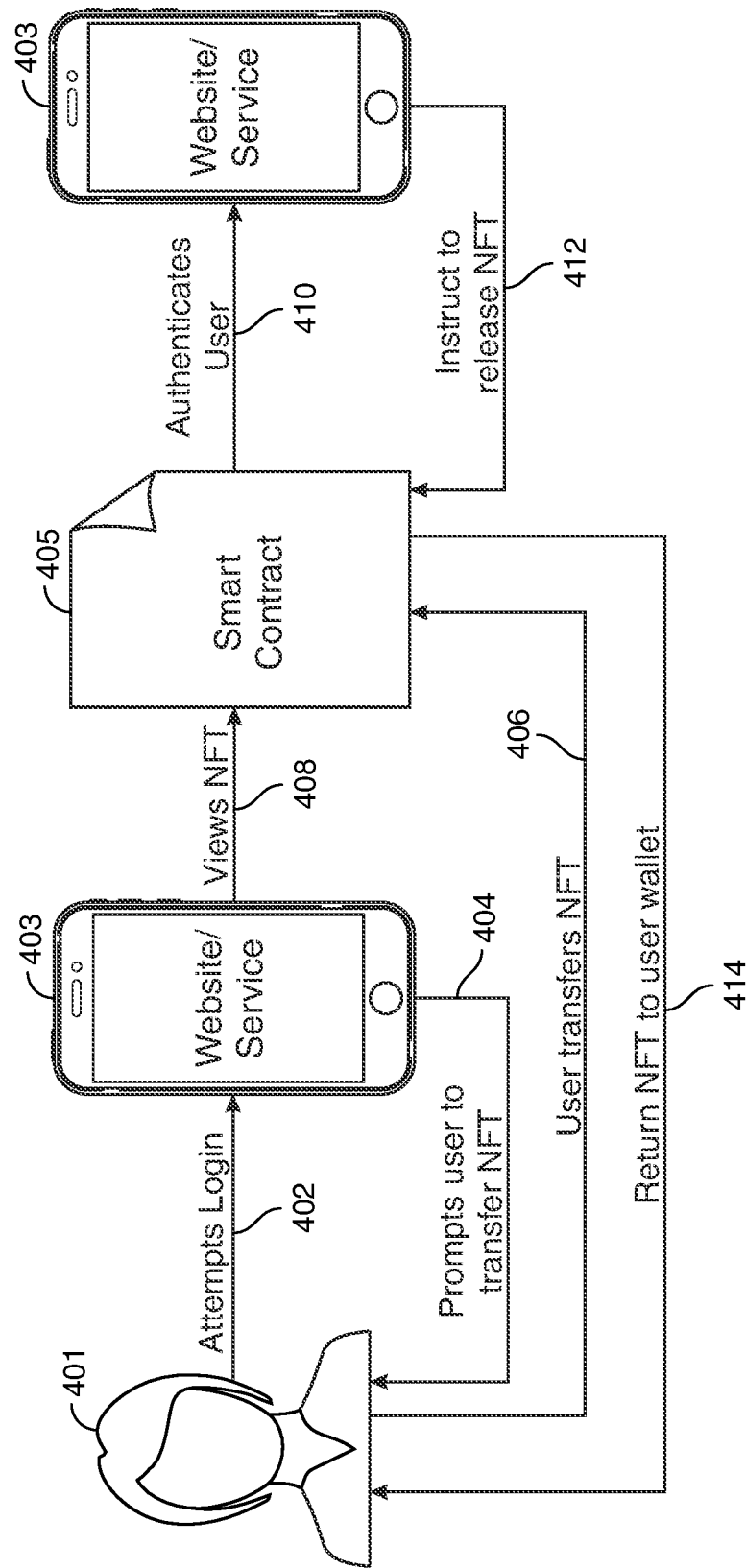
FIG. 4 shows an illustrative flowchart in accordance with principles of the disclosure.

FIG. 4 shows an illustrative flowchart in accordance with principles of the disclosure. Methods may include some or all of the method steps even-numbered 402-414 on apparatus odd-numbered 403 and 405, by user 401. Methods may include the steps illustrated in FIG. 4 in an order different from the illustrated order. The illustrative method shown in FIG. 4 may include one or more steps performed in other figures or described herein. Steps 402-414 may be performed on the apparatus shown in FIGS. 1-3, and 6, or other apparatus.

A user 401 may attempt to login at step 402 to a website/service on smartphone 403. Other computing devices may be used. The smartphone 403 or website/service may prompt the user 401 to transfer an NFT to a smart contract 405 at step 404. At step 406, the user 401 may transfer the NFT to the smart contract 405. At step 408, the smartphone 403, the website/service, or an authentication program may view the NFT at the smart contract 405. At step 410, the smartphone 403, the website/service, or the authentication program may authenticate the user, when it is determined that the NFT was assigned to the user and the user actually transferred it to the smart contract 405.

At step 412, the smartphone 403, the website/service, or the authentication program may instruct the smart contract 405 to release the NFT back to the user 401. And, at step 414, the smart contract 405 may release the NFT back to the user 401, i.e., return the NFT to the user's wallet on the distributed ledger/blockchain.

Figure 5:
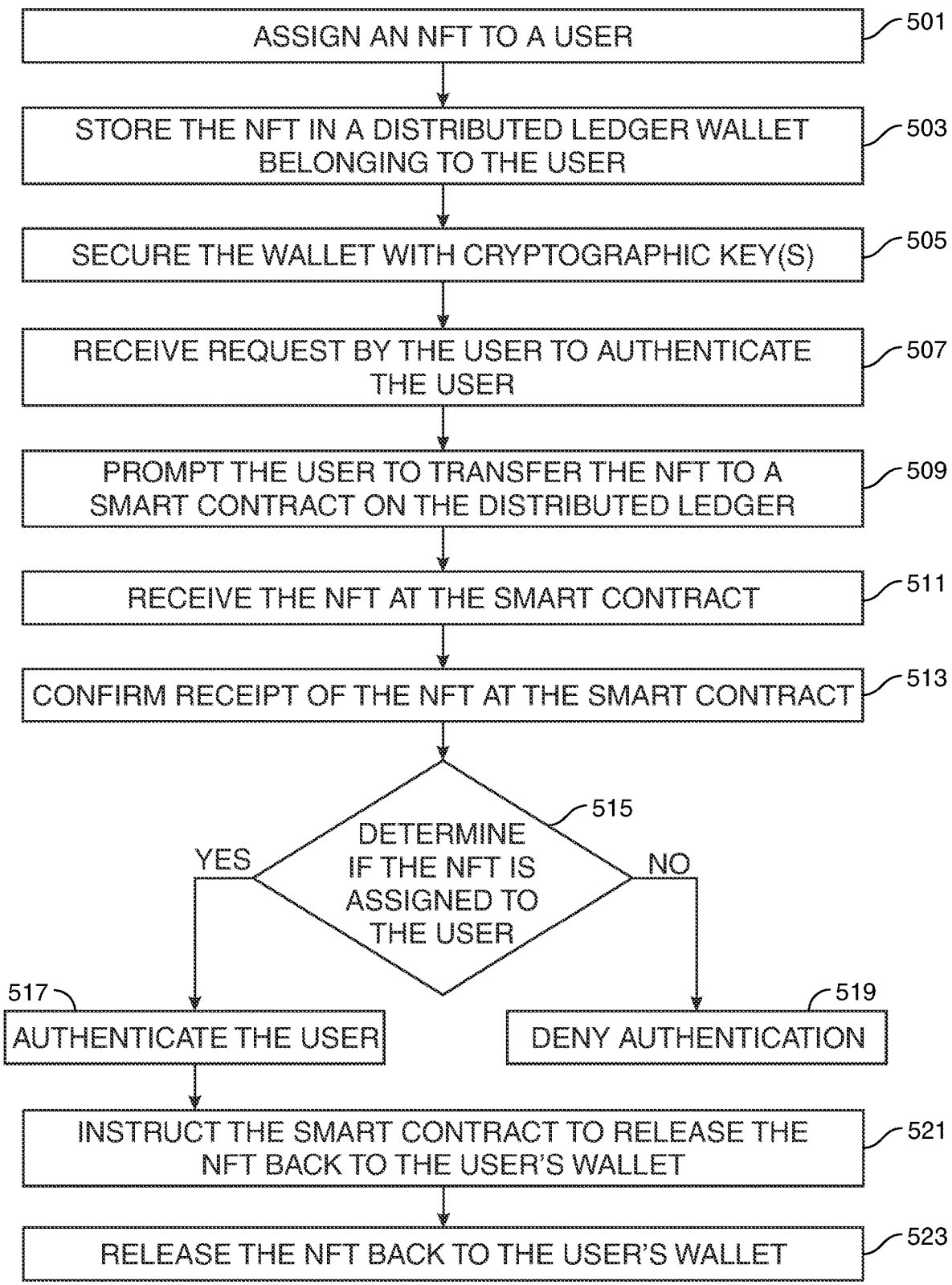
FIG. 5 shows an illustrative flowchart in accordance with principles of the disclosure.

FIG. 5 shows an illustrative flowchart in accordance with principles of the disclosure. Methods may include some or all of the method steps numbered 501 through 523. Methods may include the steps illustrated in FIG. 5 in an order different from the illustrated order. The illustrative method shown in FIG. 5 may include one or more steps performed in other figures or described herein. Steps 501 through 525 may be performed on the apparatus shown in FIGS. 1-3, and 6, or other apparatus.

At step 501, an organization or other entity may assign an NFT to a user. The organization or entity may be public or private. The NFT may be singular. The NFT may include data or metadata that may be used to identify and authenticate the user, such as the user's name, or a unique ID code.

At step 503, the NFT may be stored in a wallet on a distributed ledger/blockchain belonging to the user. At step 505, the wallet may be secured with one or more cryptographic keys. An exemplary cryptographic system may be a private key/public key paradigm. As long as the user maintains the security and control of her wallet, the NFT should be secure in the wallet. If the user loses access, or a malicious actor circumvents the security, the NFT may lose its ability to identify and authenticate the user.

At step 507, an authentication program, a server, a website/service, an entity, etc. may receive a request from the user to authenticate the user. The authentication program, server, website/service, entity etc. may be referred to as the recipient of the request. For example, the user may attempt to log into a website or application. The attempt may include sending a request to authenticate the user to a server or other authentication program. At step 509, the recipient of the authentication request may prompt the user to transfer the NFT to a smart contract located on the distributed ledger/blockchain. The smart contract may be a location/wallet on the ledger comprising executable code.

At step 511, the user may transfer the NFT to the smart contract, and the NFT may be received at the smart contract. This transaction may be recorded on the ledger. At step 513, the recipient of the authentication request may confirm that the smart contract received the NFT. The confirmation may be performed by checking the ledger and/or the wallet containing the smart contract.

At step 515, the recipient of the request may determine if the NFT is assigned to the user who made the request. If yes, at step 517, the recipient may authenticate the user. At step 521, the recipient may instruct the smart contract to release the NFT back to the user's wallet. And, at step 523, the smart contract may release the NFT back to the user's wallet. If the recipient determines that the NFT does not belong to the user who initiated the authentication request, at step 519, the recipient may deny authentication.

Figure 6:
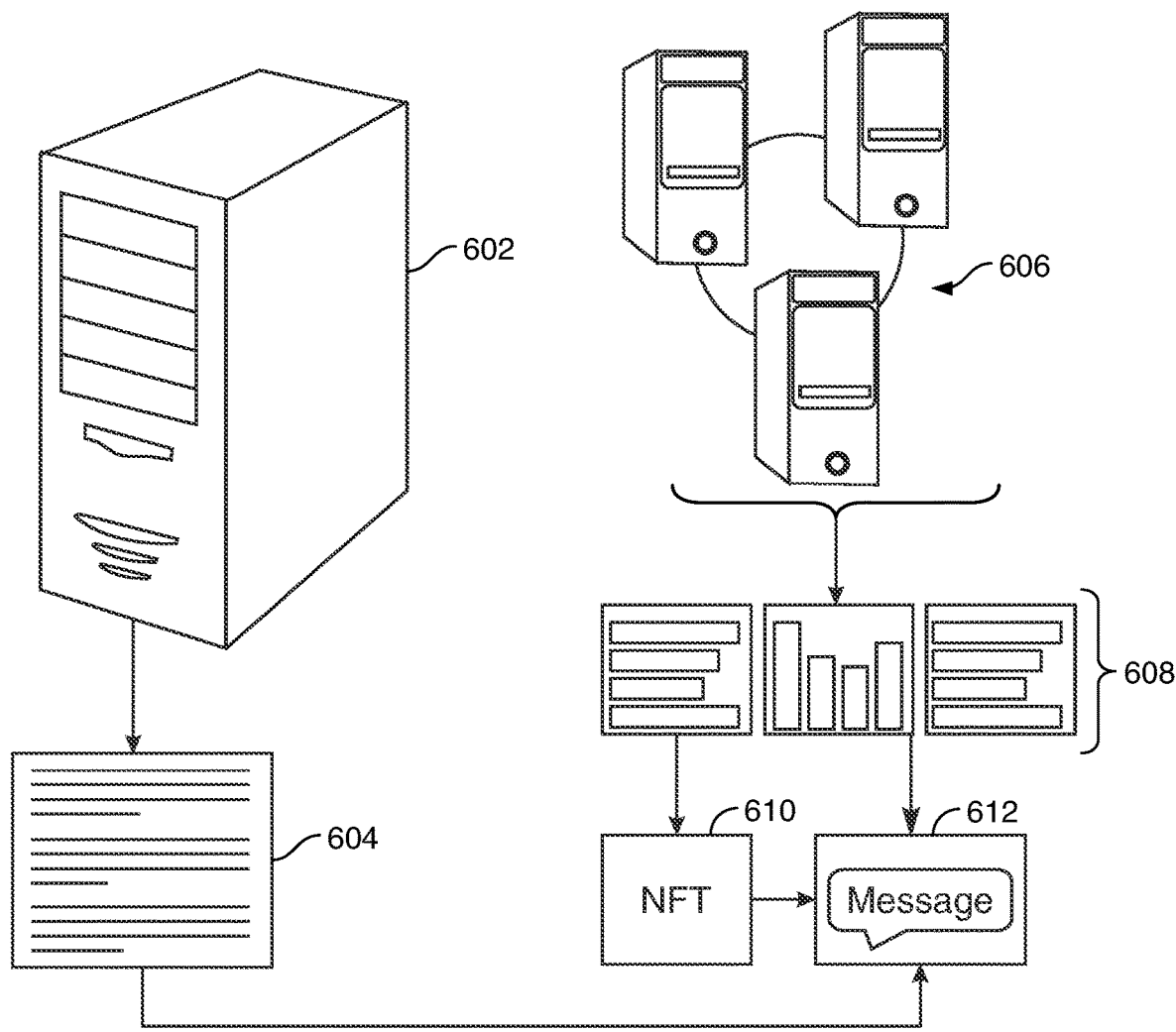
FIG. 6 shows an illustrative apparatus in accordance with principles of the disclosure.

FIG. 6 shows an illustrative apparatus in accordance with principles of the disclosure. A server 602 may include an authentication program 604. Multiple distributed computers 606 may include copies of a distributed ledger/blockchain 608. The distributed ledger may include one or more NFTs 610, each belonging/assigned to a single person/user (not shown). Each user may use the NFT and sign a message 612 on the ledger 608. The authentication program 604 may view the signed message 612 (as well as the ledger 608 and NFT 610) to authenticate the user.

Figure 7:
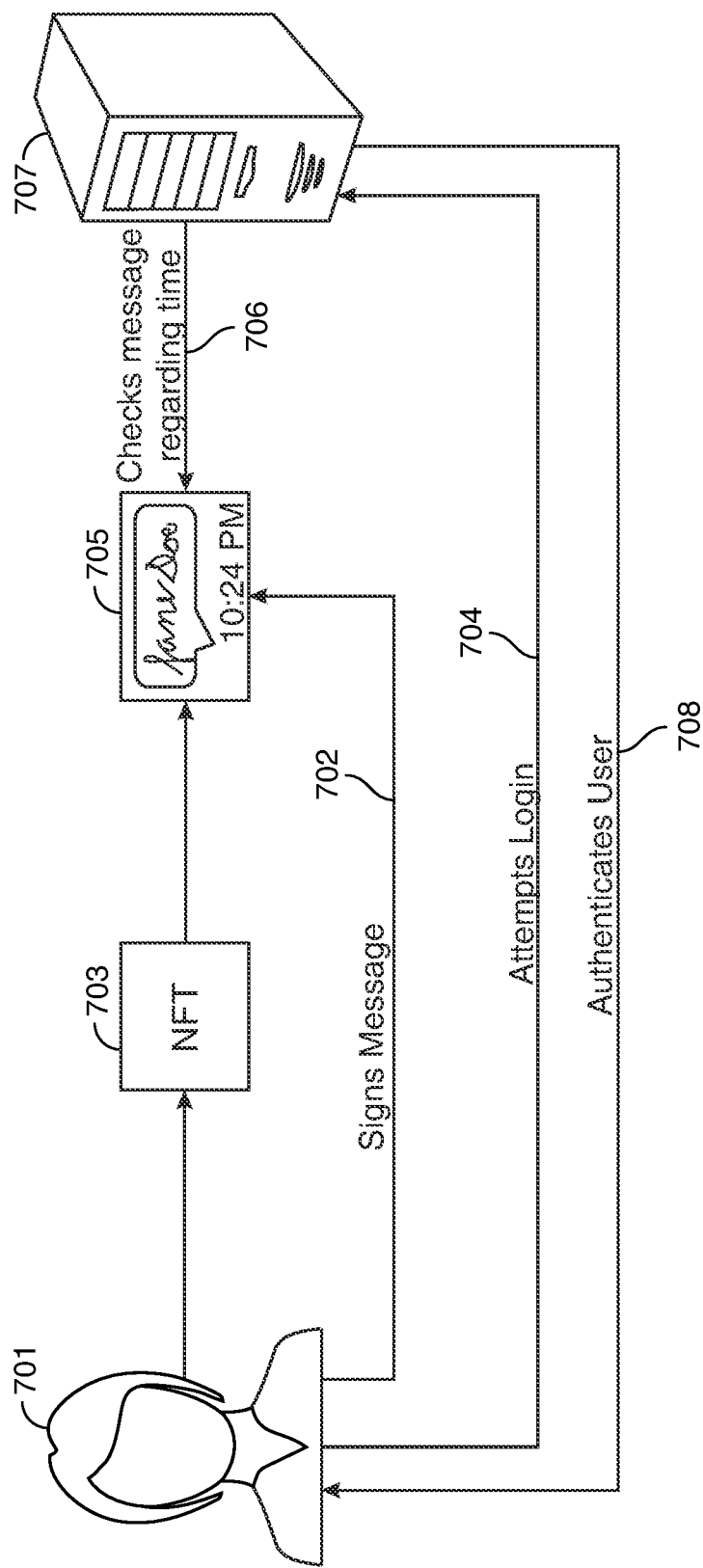
FIG. 7 shows an illustrative flowchart in accordance with principles of the disclosure.

FIG. 7 shows an illustrative flowchart in accordance with principles of the disclosure. Methods may include some or all of the method steps even-numbered 702-708 on apparatus odd-numbered 703-707, by user 701. Methods may include the steps illustrated in FIG. 7 in an order different from the illustrated order. The illustrative method shown in FIG. 7 may include one or more steps performed in other figures or described herein. Steps 702-708 may be performed on the apparatus shown in FIGS. 1-3, and 6, or other apparatus.

At step 702, the user 701, using NFT 703, may sign a message 705 at a particular time on a distributed ledger/blockchain (not shown). At step 704, user 701 may attempt to login to a website/service, entity, etc. The website/service etc. may use an authentication program running on a server 707 to authenticate users attempting to login.

At step 706, the server 707 may view the message 705 and check the time it was signed. If it was signed within a pre-determined length of time before or after the login attempt (at step 704), the server 707 may authenticate the user 701 at step 708. If too much time has elapsed between the signing of the message the server may deny authentication to the user. The length of time may be fixed or adjustable. It may be adjustable via a machine-learning algorithm.

Thus, apparatus and methods for utilizing NFTs as universal digital identification are provided. Persons skilled in the art will appreciate that the present invention can be practiced by other than the described embodiments, which are presented for purposes of illustration rather than of limitation.

What is claimed is:

1. A method for utilizing a non-fungible token ("NFT") as a universal digital identification, the method comprising:
   assigning a singular NFT to a user;
   storing the NFT in a distributed ledger wallet belonging to the user;
   securing the wallet with a public cryptographic key and a private cryptographic key, wherein the private cryptographic key is only accessibly by the user;
   receiving, at an authentication server remote from the user, a request by the user to authenticate the user;
   prompting, by the authentication server, the user to transfer the NFT to a smart contract located on the distributed ledger;
   receiving, at the smart contract, the NFT;
   confirming, by the authentication server, receipt of the NFT at the smart contract;
   determining, by the authentication server, that the NFT is assigned to the user;
   authenticating, by the authentication server, the user;
   instructing, by the authentication server, the smart contract to release the NFT back to the user's wallet; and
   releasing, by the smart contract, the NFT back to the user's wallet.

2. The method of claim 1 further comprising, when the authentication server fails to release the NFT back to the user's wallet, releasing the NFT back to the user's wallet at the end of a pre-determined length of time.

3. The method of claim 2 wherein the pre-determined length of time is five minutes after receipt of the NFT at the smart contract.

4. The method of claim 1 further comprising recording, on the distributed ledger, the receipt of the NFT by the smart contract and the release of the NFT back to the user's wallet.

5. The method of claim 1 wherein the smart contract is further configured to:
   hold the NFT for a pre-determined length of time after receipt;
   alert the authentication computer program that the NFT was received;
   record, on the distributed ledger, when the NFT is received; and
   release the NFT back to the user's wallet at the earlier of:
      an end of the pre-determined length of time; or
      receiving the instructions from the authentication server to release the NFT back to the user's wallet.

6. The method of claim 1 wherein the NFT is encrypted.

7. The method of claim 1 wherein the distributed ledger comprises a blockchain.

8. The method of claim 1 wherein the user is assigned the NFT by an organization implementing an authentication standard.

9. The method of claim 5 wherein the pre-determined length of time is five minutes.

10. The method of claim 1 wherein the user transfers the NFT to the smart contract via a cryptographic key while keeping a private version of the cryptographic key hidden.

11. The method of claim 1 wherein the NFT includes information to authenticate the user and a record of where the NFT has been located on the distributed ledger.

* * * * *